United States Patent [19]
Feres

[11] Patent Number: 6,110,617
[45] Date of Patent: Aug. 29, 2000

[54] FLOODED LEAD ACID BATTERY WITH ROLL-OVER CAPABILITY

[75] Inventor: Fred F. Feres, Rochester Hills, Mich.

[73] Assignee: Exide Corporation, Reading, Pa.

[21] Appl. No.: 09/042,720

[22] Filed: Mar. 17, 1998

[51] Int. Cl.[7] .................................................. H01M 2/12
[52] U.S. Cl. ........................... 429/86; 429/88; 428/66.4; 428/66.7
[58] Field of Search ................................. 429/86, 87, 88, 429/89; 428/66.4, 66.7

[56] References Cited

U.S. PATENT DOCUMENTS

| | | | |
|---|---|---|---|
| 3,507,708 | 4/1970 | Vignaud | 429/86 |
| 4,214,045 | 7/1980 | Jutte et al. | 429/87 |
| 5,209,992 | 5/1993 | Feres | 429/86 |
| 5,422,199 | 6/1995 | Adams et al. | 429/89 X |
| 5,486,429 | 1/1996 | Thibault | 429/86 X |
| 5,565,282 | 10/1996 | Feres et al. | 429/84 |
| 5,663,010 | 9/1997 | Stocchiero | 429/86 |
| 5,691,076 | 11/1997 | Poe | 429/53 |

*Primary Examiner*—Stephen Kalafut
*Attorney, Agent, or Firm*—Nixon & Vanderhye P.C.

[57] ABSTRACT

A flooded lead acid battery includes a casing enclosing a plurality of cells having liquid electrolyte therein and a cover incorporating negative and positive terminals and having a plurality of vent holes. The vent holes are covered by at least one closure having a vent cavity therein, and a relatively rigid porous polytetrofluorethylene disc having hydrophobic properties is sealed within the vent cavity.

26 Claims, 6 Drawing Sheets

FLOODED LEAD ACID BATTERY WITH ROLL-OVER CAPABILITY

TECHNICAL FIELD

This invention relates to lead acid batteries in general, and to an improved battery vent configuration which prevents corrosive acids from being spilled when the battery is on its side or even upside down as the result of mishandling the battery, vehicle accident or the like.

BACKGROUND AND SUMMARY OF THE INVENTION

Flooded lead acid batteries (batteries with liquid electrolyte) designed for starting, lighting and ignition (SLI) experience a variety of rough handling during manufacture, storage and distribution including an occasional accidental tilting of the battery on its side, a variety of angled inclines once the battery is installed within a vehicle, as well as normal vibrations. During normal operation of a battery, water is electrolyzed into hydrogen and oxygen while temperature excursions produce water vapor, both of which will tend to be lost through the battery venting system. A well designed vent network must prevent this loss by capturing, condensing and draining all fluids back into the cells. The vent system must also prevent or minimize spilling, and safeguard the battery against external ignition sources. Typically, the vent system includes one or more vent recesses or cavities in which flame arresters are seated. These flame arresters are usually in the form of glass or polypropylene frit material (also referred to simply as "frits") which permit the passage of vapor out of the battery casing but prevent flame intrusion into the battery. At the same time, the flow cover or gang vent manifold cover may be designed to create a flow path which minimizes spilling, at least when the battery is tilted 90° to one side or the other. See, for example, commonly owned U.S. Pat. No. 5,565,282.

Tougher criteria are currently being implemented, or will be implemented in the future, regarding spillage of electrolyte from flooded lead acid batteries to the extent of requiring spillage prevention even when the battery is turned over, i.e., inverted. Thus, there is a need to have flooded lead acid batteries designed to prevent the spilling of corrosive acids not only when the batteries are subjected to a high degree of tilt or even turned on one side, but also when the battery is turned completely upside down as may happen in an automobile accident or as a result of accidental mishandling during installation, removal or transit. Presently, this goal is accomplished by an expensive lead acid battery design utilizing gelled electrolytes, or by using AGM oxygen recombinant valve regulated (VRLA) batteries.

In accordance with this invention, a simple and less costly solution is provided by utilizing porous, hydrophobic polytetrafluoroethylene (PTFE) or TEFLON® discs or frits sealed within the existing battery vent recesses as replacements for the conventional polypropylene flame retardant frits. These porous PTFE discs are sealed within the battery vent cavities and permit the passage of gas but prevent passage of liquid, while also preventing flame intrusion. No modification of current battery component designs is required, since the frit can be shaped and sized to fit existing vent cavities.

In accordance with associated manufacturing techniques, it has been possible to obtain similar dimensional and physical features along with adequate air flow rate so that no changes in the existing battery cover or gang vent configuration is required to permit substitution of the existing frits and thereby achieve the desired anti-spillage goal.

In addition, the porous PTFE frit in accordance with this invention can be used wherever battery vents are currently located in individual threaded or pushin vent caps, in removable gang vent covers, or in manifold covers heat sealed to the battery cover.

A number of manufacturing techniques for sealing the PTFE discs within existing battery vents have proven successful. In a first technique, a slab of silicone grease is applied to the periphery of the PTFE disc. Subsequently, the upper rim of the polypropylene wall which defines the vent opening is crimped over the upper annular edge of the disc, utilizing applied heat.

Another technique is to mold the PTFE disc with a polypropylene skin or ring surrounding at least the side wall of the disc. This allows the disc assembly to be conventionally and easily welded to the polypropylene vent material. In a variation of the above technique, the frit/ring assembly can be sonically welded to the cover. Further in this regard, it may well be possible to mold the polypropylene battery cover manifold around the PTFE disc, but this arrangement would be more costly due to the requirement for new mold designs.

Another sealing technique is to mold the PTFE disc so as to have an outer diameter establishing an interference fit within the vent cavity. While this technique may be viable in many situations, the temperature range of the battery environment must be maintained below 190° F. to avoid relaxation of the polypropylene which would otherwise break the seal.

Finally, it is possible to utilize a high temperature horn for melting an upper annular edge of the PTFE disc so that the heat is transmitted to the outer polypropylene walls to form a "skin" seal.

Accordingly, in its broader aspects, the invention relates to a flooded lead acid battery which includes a casing enclosing a plurality of cells having liquid electrolyte therein and a cover incorporating negative and positive terminals and having a plurality of vent holes, the vent holes covered by at least one closure having a vent cavity therein, the improvement comprising a porous polytetrofluorethylene disc having hydrophobic properties sealed within the vent cavity.

In another aspect, the invention relates to a battery cover having positive and negative terminals, and a manifold covering a plurality of cell openings in the cover; the manifold having a corresponding plurality of closures for engagement with the cell openings, and at least a pair of vent openings, the vent openings each including recesses on an underside of the manifold, with an internal gas passageway leading from each recess to atmosphere, the improvement comprising a relatively rigid porous polyletrofluorethylene disc having hydrophobic properties sealed within each of the vents.

In still another aspect, the invention relates to a lead acid, flooded battery comprising a battery casing including a plurality of cells defined by vertically oriented electrodes, and wherein the cells contain a liquid electrolyte; a battery casing cover having a plurality of cell openings therein; the cover also having one or more vent openings for permitting vapor to escape from inside the battery; wherein each vent opening includes a porous polytetrofluroethylene disc sealed therein.

In still another aspect, the invention relates to a porous polytetrofluorethylene disc for securement within a lead acid battery vent cavity provided in a battery component, the disc surrounded by a ring of material compatible for purposes of welding or heat sealing with material used for forming the vent cavity.

Other objects and advantages of the subject invention will become apparent from the detailed description which follows.

DETAILED DESCRIPTION OF THE DRAWINGS

Figure 1:
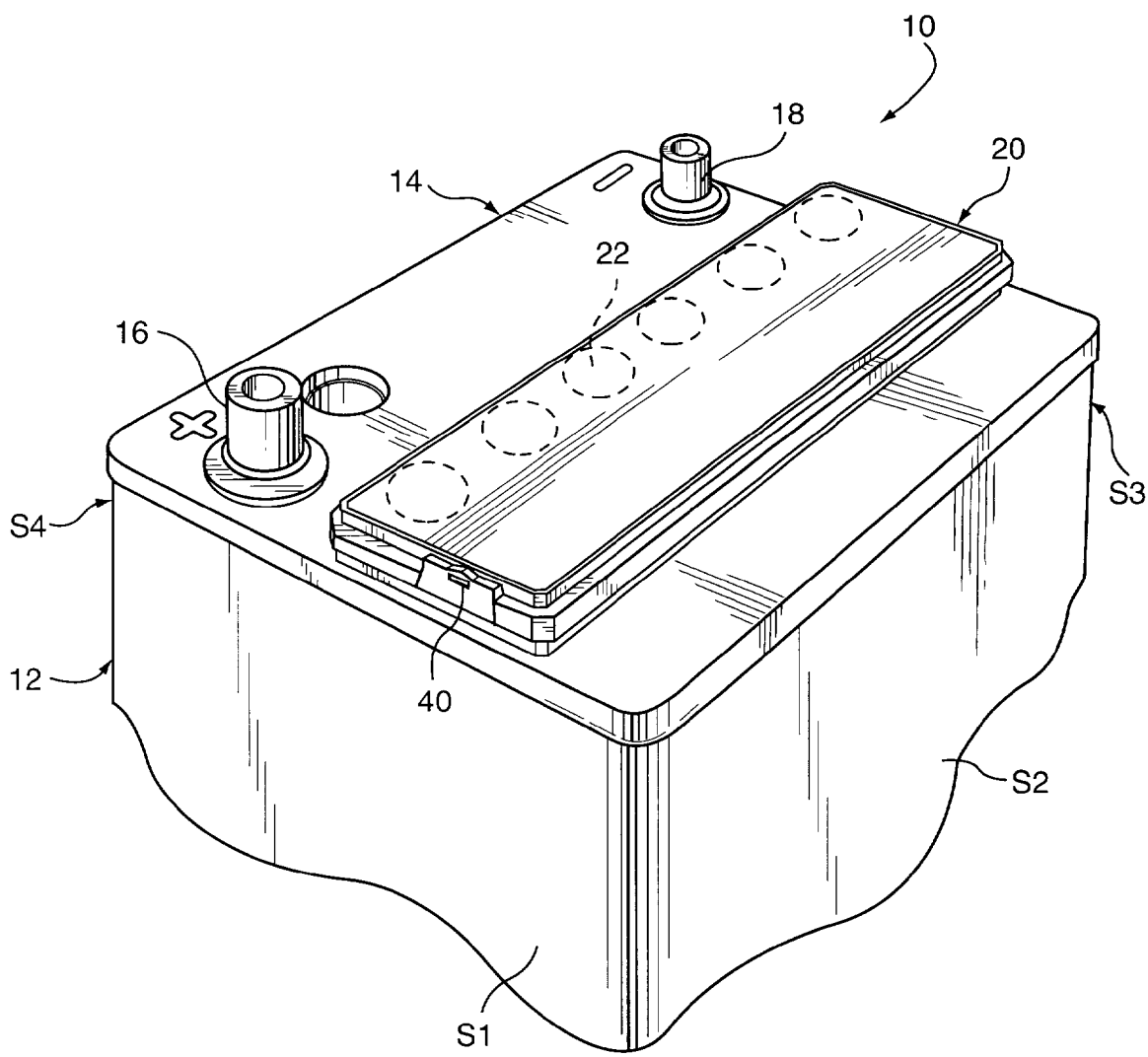
FIG. 1 is a perspective view of a conventional battery incorporating the anti-spill vent disc in accordance with this invention.
Figure 3:
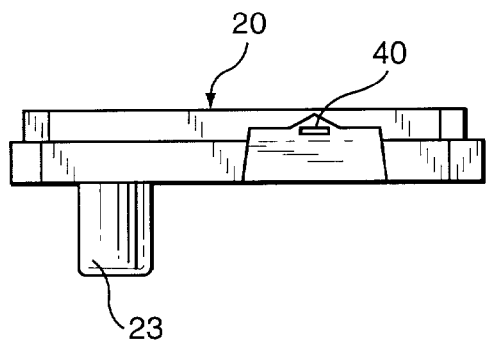
FIG. 3 is a side elevation of the manifold cover shown in FIGS. 1 and 2.

With reference to FIG. 1, a maintenance-free battery 10 typically includes a casing 12 in which are located the individual cells and liquid electrolyte, and a cover 14 which is typically heat sealed to the casing. Lead posts 16, 18 provide positive and negative terminals, respectively, which project from the cover and are adapted to receive cable connections in a conventional manner. A manifold vent cover 20 overlies the cell openings 22 (shown in phantom in FIG. 1 but see also FIG. 2) formed in the cover. In maintenance free batteries, the manifold cover 20 is heat sealed to the battery cover 14, i.e., the manifold cover 20 is not intended to be removed during the useful life of the battery.

Figure 2:
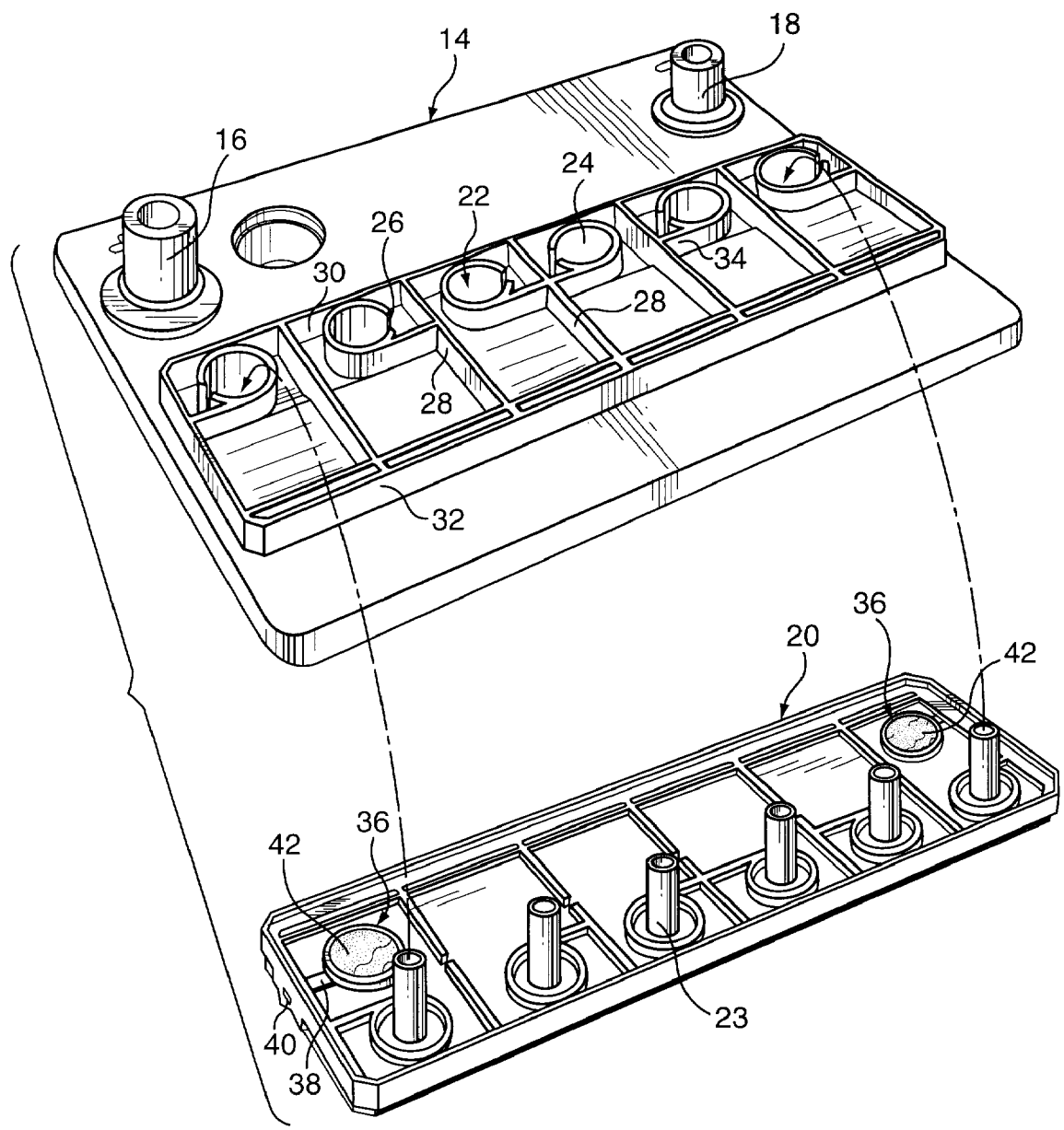
FIG. 2 is a perspective view of the battery cover removed from the battery shown in FIG. 1, and with the manifold cover removed from the battery cover.

With specific reference to FIG. 2, the underside of the manifold 20 in accordance with the invention is formed with a plurality of hollow posts 23 which extend down into the cell openings 22 formed in the cover. As illustrated in FIG. 2, the cell openings 22 on the battery cover are defined in part by upstanding cylindrical walls 24, each discontinuous in the circumferential direction to provide a gap 26. At the same time, each cell opening is confined within a generally rectangular area as defined primarily by upstanding, parallel ribs 28 of equal height with walls 24, along with end walls 30,32. Each of the walls 24 is also connected to an adjacent rib 28 by a transverse wall section 34, also of equal height.

This arrangement in cooperation with a similar arrangement on the underside of the manifold cover establishes a desired flow pattern for the electrolyte in the event of battery tilt or turn over. The specifics of the electrolyte flow path are not critical, however, to the subject matter of this invention as claimed herein.

At the remote ends of the manifold cover 20, round vent recesses or cavities 36 are integrally formed which are connected to atmosphere by passages 38 internal to the manifold. These passages open at slits 40 at opposite ends of the manifold cover 20. It is in these vent recesses or cavities 36 that the new porous PTFE discs or frits 42 are located and sealed.

Figure 4:
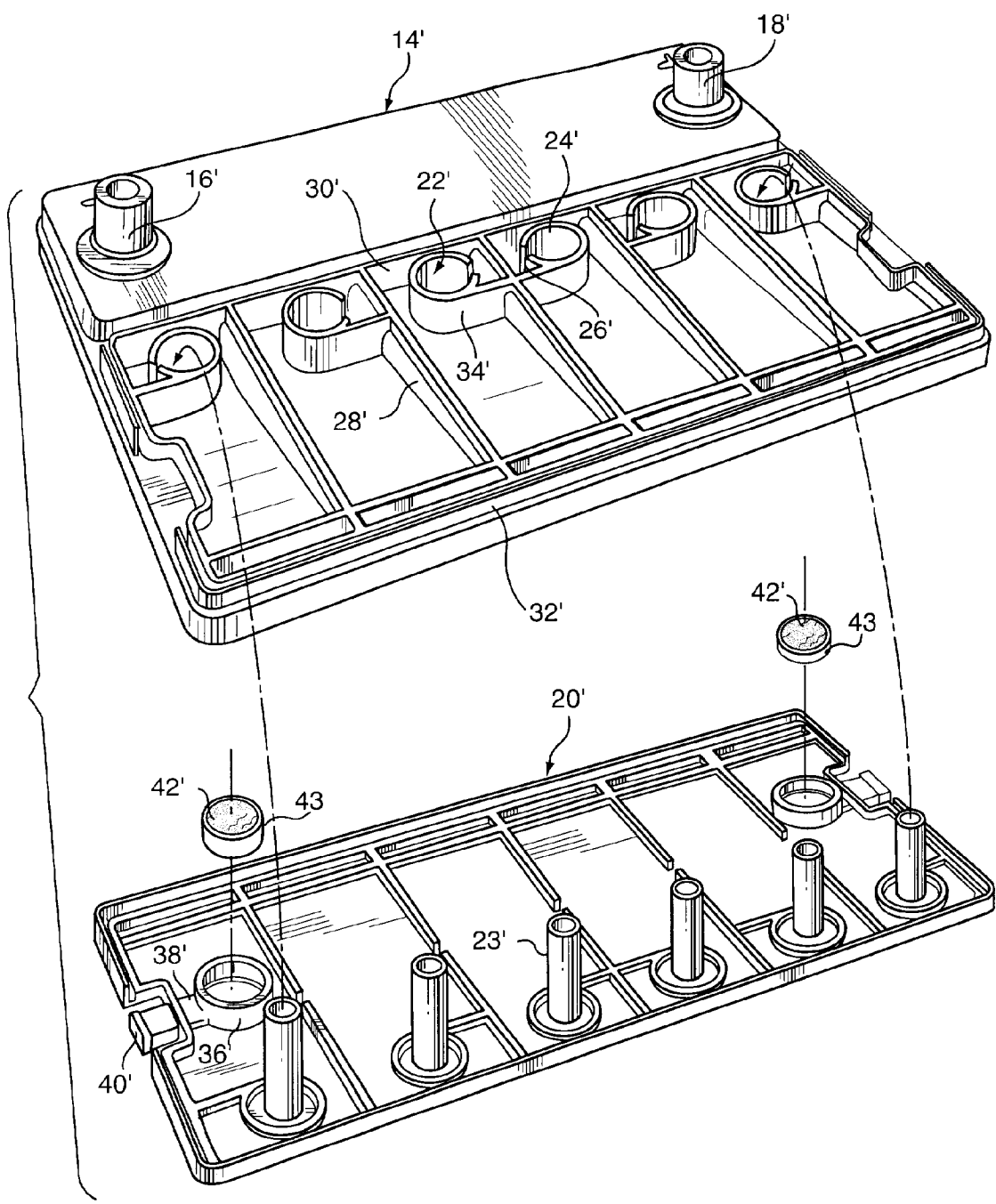
FIG. 4 is a perspective view similar to FIG. 2 but illustrating a recessed manifold cover in a flat battery cover arrangement.

A similar arrangement is shown in FIG. 4 but in the context of a "flat top" battery cover where the manifold cover is itself substantially flush with the top surface of the battery cover. For convenience, the same reference numerals are used in FIG. 4 to indicate corresponding components, but with the "prime" designation added. Note in this case, however, that the frits 42' are enclosed within a polypropylene sleeve or skin 43, the purpose for which will be described further herein.

The preferred PTFF material for the frits 42 is available from Performance Plastics Products, a division of EGC Corporation, under the trade name Permeon™. The material could be specified, however, and supplied under other trade names as well. This is an unfilled, hydrophobic and relatively rigid PTFE material with an open structure which allows consistent permeation of vapors but not liquids. The properties of the Permeon™ material are as follows:

| | |
|---|---|
| Tensile strength | 1,500–3,000 psi |
| Elongation (D638) | 100–200% |
| Flexural modulus (D747) | 50,000–90,000 lb/in$^2$ |
| Impact strength, Izod (D256) | 2 ft. lbs/in |
| Hardness durometer (D1706) | D50–65 |
| Coefficient of linear thermal expansion per ° F., 73–140° F. (D696) | 5.5 × 10$^{-5}$ |
| Water absorption (D570) | <.01% |
| Flammability (D635) | Nonflammable |
| Specific gravity (depending on leak rate specified) (D792) | 1.9–2.16 g/cc |
| Maximum use temperature | 500° F. |

The leak rate of liquid through the frit 42 can be varied to suit customer specifications by choice of particle size and frit dimensions, particularly thickness. For this application, the frit material is engineered to prevent any liquid leak when the frit is located under a 10 inch high column of water (average SLI battery height) for a period of 24 hours. By way of example, the frit may have a thickness of from about 0.080 to about 0.225 inch and a diameter of about 0.5 inch to 1.0 inch. In other words, no liquid electrolyte will leak out of the battery through the frits 42 for at least 24 hours when the battery is fully inverted. It should also be noted here that the frit 42 in accordance with this invention also provides the necessary flame intrusion prevention of current polypropylene frits. In fact, the frits of this invention may be superior in this respect in light of the high temperature assistance of the porous PTFE.

With this frit construction, increasingly specified tests such as the BMW "Rollover Test" is easily met. Moreover, because the frit in accordance with this invention requires no change to existing battery and manifold covers, nor to current screw-in or push-in vent caps, it is easily incorporated simply by customer preference, at little added cost.

Figure 5A:
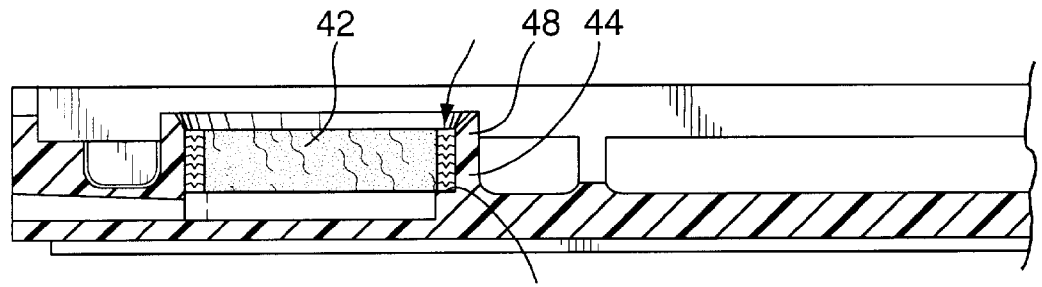
FIGS. 5A and 5B illustrate one technique for sealing an anti-spill frit within a vent cavity in a manifold cover.
Figure 5B:
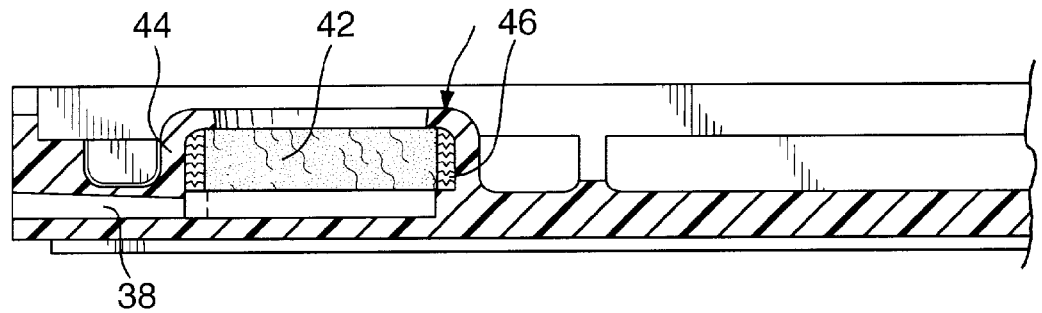

FIGS. 5A, 5B show the manner in which the frits 42 are secured within the vent cavities 36, each of which is defined in part by an upstanding cylindrical wall 44. An internal radial shoulder 46 provides edge support for the frit, and note again the internal passage 38 terminating at slit 40. Because the PTFE frit 42 is not compatible with polypropylene (at least in terms of welding or heat sealing), typically used for the battery casing 12, cover 14 and manifold 20, it was necessary to develop new retention/sealing techniques to insure that the frit is properly and effectively sealed within the vent opening to prevent liquid leakage around the frit. The approach in FIGS. 5A and 5B includes application of a chemically inert (up to 500° F.) silicone grease 48 to the peripheral edge of the PTFE disc 42, followed by crimping the upper annular edge of wall 44 radially inwardly about the upper edge of the disc 42 with the application of heat at a temperature which softens the material sufficiently to enable it to be uniformly crimped about the upper edge of the frit. This creates a continuous mechanical seal about the upper edge of the frit which, combined with the liquid seal created by the grease 48, precludes any liquid from escaping to the passage 38 around the periphery of the disc 42.

Figure 6A:
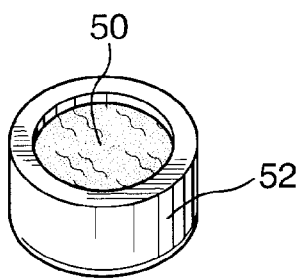
FIG. 6A is a perspective view of a anti-spill frit in accordance with another exemplary embodiment of the invention.
Figure 6B:
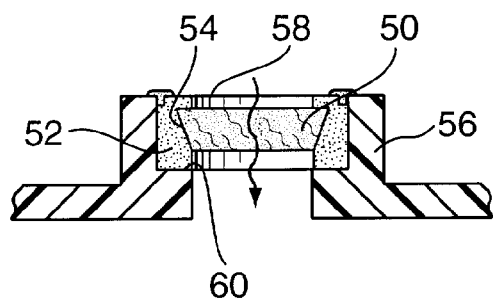
FIG. 6B is a partial section view illustrating the manner in which a frit as shown in FIG. 6A can be secured within a manifold cover vent cavity.

A different approach to sealing the disc within the vent recess is illustrated in FIG. 6B. Here, a porous PTFE frit 50 is molded to include an annular outer ring or "skin" 52 of polypropylene (similar to frit 42' in FIG. 4). The frit peripheral wall 54 may taper downwardly and inwardly, and the ring 52 conforms to the taper on its interior side but has a straight outer surface which matches the internal surface of the vent cavity wall 56. The skin 52 also has an upper radial flange or edge 58 which overlaps the edge of the frit. The latter is seated on the radial shoulder 60 in the vent cavity. With the frit 50 enclosed by the polypropylene ring 52, the assembly is easily welded and sealed to the polypropylene cover incorporating the vent cavity. In this regard, a hot weld seal can be formed at the top of the frit. Alternatively, a sonic seal can be implemented where the frit sleeve or skin 52 engages the shoulder 60 on the vent cavity wall.

Figure 7A:
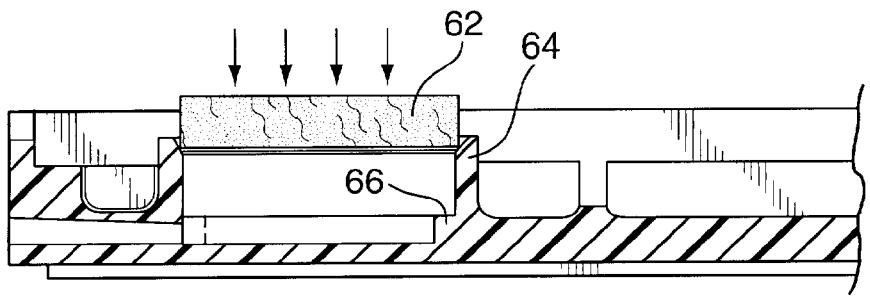
FIGS. 7A and 7B illustrate another assembly and sealing technique for an anti-spill frit in accordance with the invention.
Figure 7B:
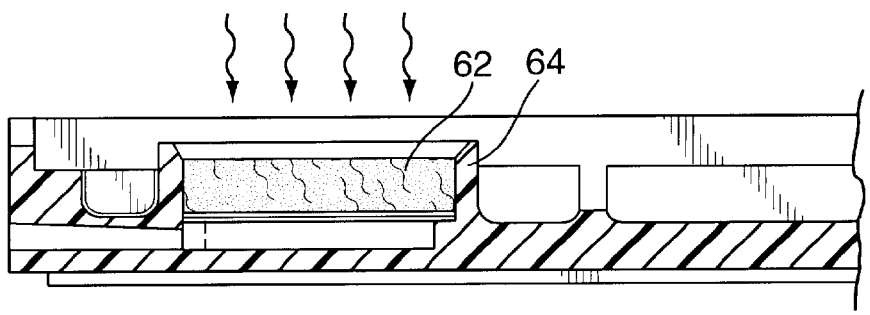
Figure 8A:
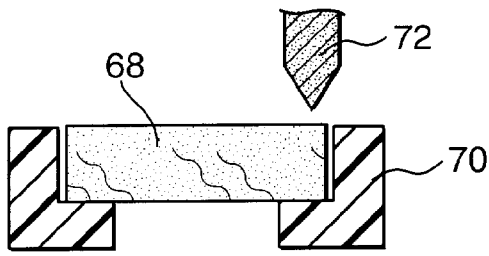
FIGS. 8A through 8D illustrate still another manner of assembly of an anti-spill frit in a manifold cover in accordance with the invention.
Figure 8B:
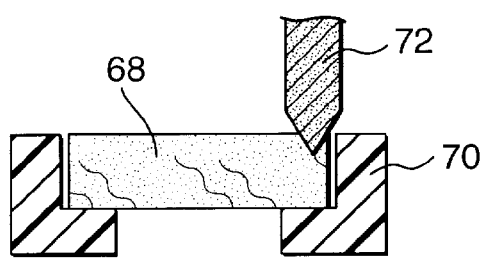
Figure 8C:
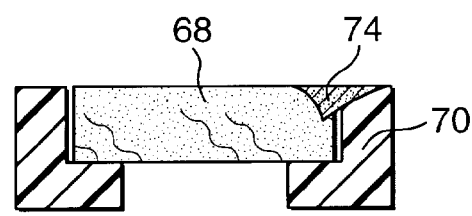
Figure 8D:
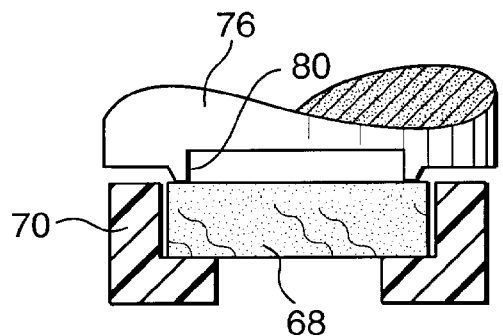

Turning now to FIGS. 7A and 7B, another sealing technique is shown which involves compression fitting a porous PTFE frit 62 into the vent cavity as defined by peripheral wall 64 and radial shoulder 66. More specifically, an oversized, right-cylinder shaped frit 62 is molded with an interference fit, i.e., with a diameter 0.005"–0.010" over the inside diameter of the cylindrical vent cavity wall 64 so that when the frit is pressed into the vent cavity, it is under peripheral compression and thus sealed. While this method has proven effective, the temperature range of the battery must be maintained below 190° F. to avoid relaxation of the polypropylene vent cavity and consequent breaking of the seal.

FIGS. 8A–D illustrate still another viable sealing technique. In this embodiment, the PTFE frit 68 is seated within the cylindrical vent cavity as defined by peripheral wall 70 (FIG. 7A). A hot melt tool 72 (at about 680° F.) is applied to the upper edge of the frit (FIG. 7B), melting a localized region of the frit and transferring heat to the polypropylene wall 70. The latter melts at 293° F. As a result, the melted PTFE will flow over and onto the polypropylene material, with some blending of the materials to a thickness of about 0.005–0.010 inch, indicated at 74. This technique has proven successful despite the apparent incompatibility of the materials. In FIG. 7D, a heat sealing horn 76 is illustrated which is effective to seal the entire 360° frit/wall interface, using the annular tip 80.

Figure 9:
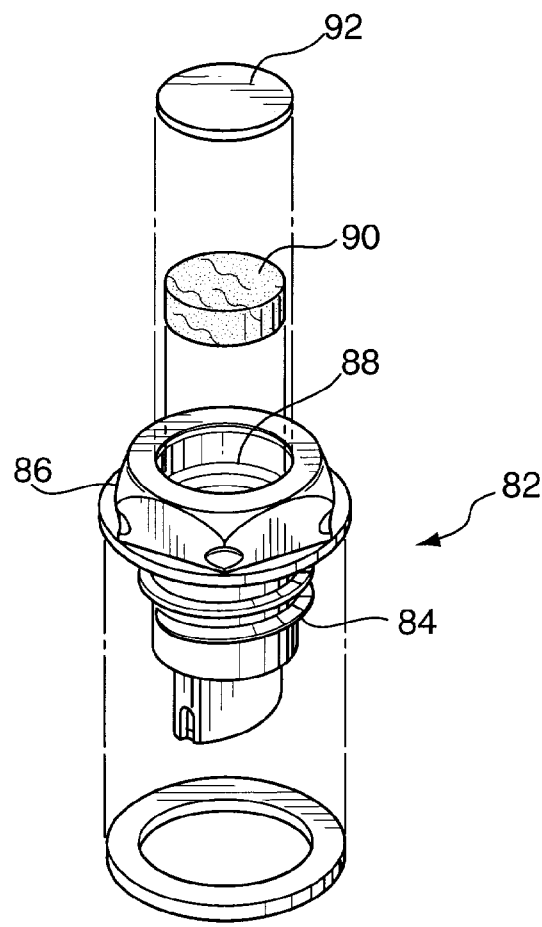
FIG. 9 is an exploded view of an individual vent cap incorporating a frit in accordance with the invention.

The subject invention is not limited to use of a porous PTFF disc or frit in a battery cell manifold cover. It is equally applicable to other battery types, such as those which utilize, for example, individual screw-on or push-in plugs. An example is shown in FIG. 9 where an individual vent plug 82 of otherwise conventional construction, includes a threaded shank 84 and a bolt-like head 86, formed to include a vent cavity 88 which typically receives a polypropylene frit (not shown). Here, however, a porous PTFE frit 90 is seated within the cavity and sealed by one of the techniques described above. A cap 92 may be employed to protect the frit, noting that the cavity, above the frit, is vented to atmosphere.

Figure 10:
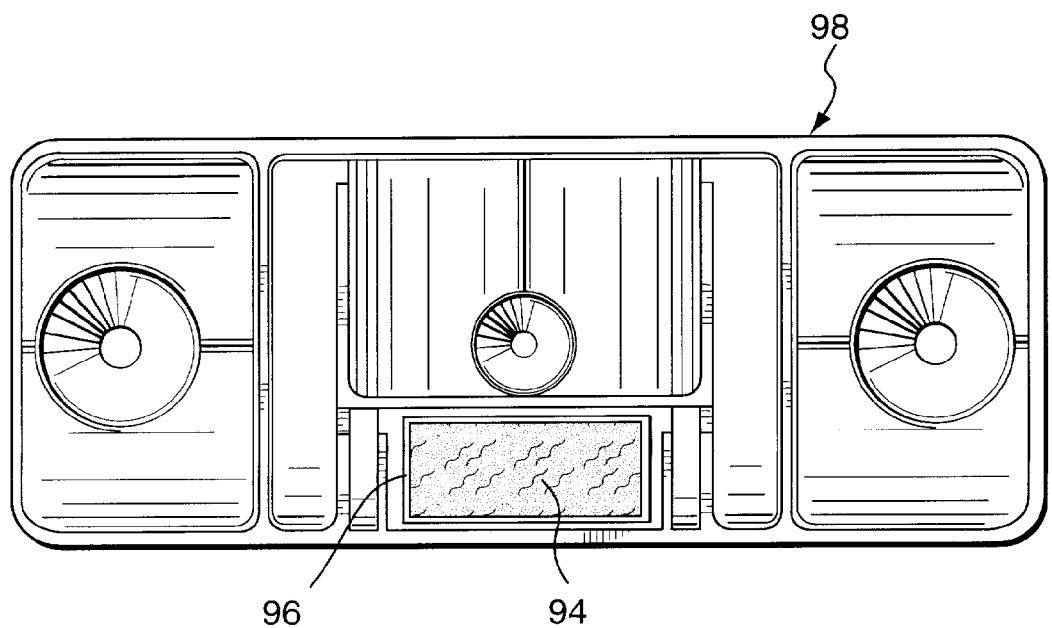
FIG. 10 is a bottom plan view of a gang vent cover incorporating a frit in accordance with the invention.

FIG. 10 illustrates still another application for the porous PTFE frit. In this embodiment, a rectangular-shaped frit 94 is seated within a similarly shaped cavity defined by wall 96 on the underside of a battery gang vent cover 98. The latter is described in more detail in commonly owned U.S. Pat. No. 5,565,282. This merely exemplifies the adaptability of the present invention to different already existing battery types.

The frit is also useful in batteries other than SLI batteries including marine and military batteries.

Finally, it should be noted that the frit or disc in accordance with this invention can be used without also having a complex electrolyte flow path as briefly described in connection with FIGS. 1–4 and 10 which are present in already existing covers, manifolds, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a flooded lead acid battery which includes a casing enclosing a plurality of cells having liquid electrolyte therein and a cover incorporating negative and positive terminals and having a plurality of vent holes, said vent holes covered by at least one closure having a vent cavity therein, the improvement comprising:

a porous polytetrafluoroethylene disc having hydrophobic properties sealed within said vent cavity, said disc having a thickness of from about 0.080 inch to about 0.225 inch, and a flexural modulus of between 50,000 and 90,000 lb/in$^2$.

2. The battery of claim 1 wherein said disc has a water absorption property of <0.01%.

3. The battery of claim 1 wherein said disc has a specific gravity of between about 1.9 and 2.16 g/cc.

4. The battery of claim 1 wherein said disc has a maximum use temperature of about 500° F.

5. The battery of claim 1 wherein said disc is substantially chemically inert up to about 500° F.

6. The battery of claim 1 wherein said disc is round, having a diameter of about 0.5 inch to 1.000.

7. The battery of claim 1 wherein said plug has a water absorption property of <0.01%; a specific gravity of between about 1.9 and 2.16 g/cc; is chemically inert up to about 500° F. and a thickness of about 0.080–0.225 inch.

8. In a battery cover having positive and negative terminals, and a manifold covering a plurality of cell openings in said cover; said manifold having a corresponding plurality of closures for engagement with said cell openings, and at least a pair of vent openings, said vent openings each including recesses on an underside of said manifold, with an internal gas passageway leading from each recess to atmosphere, the improvement comprising a rigid porous polytetrafluoreothylene disk having hydrophobic properties sealed within each of said vents, said disc having a thickness of about 0.080–0.225 inch.

9. The battery cover of claim 8 wherein said disc has a water absorption property of <0.01%.

10. The battery cover of claim 8 wherein said disc has a specific gravity of between about 1.9 and 2.16 g/cc.

11. The battery cover of claim 8 wherein said disc has a maximum use temperature of about 500° F.

12. The battery cover of claim 8 wherein said disc is substantially chemically inert up to about 500° F.

13. The battery cover of claim 8 wherein said disc is round, having a diameter of about 0.5 inch to 1.000 inch.

14. The battery cover of claim 8 wherein said disc has a water absorption property of <0.01%; a specific gravity of between about 1.9 and 2.16 g/cc; is chemically inert up to about 500° F. and a thickness of about 0.080–0.225 inch.

15. The battery cover of claim 8 wherein said manifold is permanently heat sealed to the battery cover.

16. The battery of claim 1 wherein said at least one closure comprises a plurality of vent caps, one for each vent hole, and wherein one of said discs is sealed within each of said vent caps.

17. The battery of claim 1 wherein said at least one closure comprises a gang vent cover attachable to the battery cover, said gang vent cover having at least a pair of vent cavities, each of which has one of said discs sealed therein.

18. A lead acid, flooded battery comprising:
a battery casing including a plurality of cells defined by vertically oriented electrodes, and wherein said cells contain a liquid electrolyte;
a battery casing cover having a plurality of cell openings therein;
said cover also having one or more vent openings for permitting vapor to escape from inside the battery; wherein each vent opening includes a porous polytetrafluoroethylene disc sealed therein, said disc having a flexural modulus of between 50,000 and 90,000 lb/in$^2$.

19. The battery of claim 18 wherein each vent opening is defined by a cylindrical wall, the upper edge of which is crimped over said disc.

20. A lead acid, flooded battery comprising:
a battery casing including a plurality of cells defined by vertically oriented electrodes, and wherein said cells contain a liquid electrolyte;
a battery casing cover having a plurality of cell openings therein;
said cover also having one or more vent openings for permitting vapor to escape from inside the battery; wherein each vent opening includes a porous polytetrfluoroethylene disc sealed therein, wherein said at least one closure comprises a plurality of vent caps, one for each vent holes, and wherein one of said discs is sealed within each of said vent caps; and wherein each vent opening is defined by a cylindrical wall having a lower radial shoulder supporting said disc, and further wherein said disc is surrounded and partially enclosed within an outer ring, said outer ring being welded to the cylindrical wall above said lower radial shoulder.

21. The battery of claim 19 wherein each of said vent openings is defined by a cylindrical wall and wherein said disc is press fit therein.

22. A lead acid, flooded battery comprising:
a battery casing including a plurality of cells defined by vertically oriented electrodes, and wherein said cells contain a liquid electrolyte;
a battery casing cover having a plurality of cell openings therein:
said cover also having one or more vent openings for permitting vapor to escape from inside the battery; wherein each vent opening includes a porous polytetrofluoroethylene disc sealed therein, and each vent opening is defined by a cylindrical wall, the upper edge of which is crimped over said disc; and wherein each of said discs is seated within a respective outer ring, and further wherein said disc and an upper surface of said ring are heat sealed together.

23. The battery of claim 18 wherein said disc has a thickness of about 0.080–0.225 inch.

24. A rigid porous polytetrofluoroethylene disc for securement within a lead acid battery vent cavity provided in a battery component, said disc molded to include a surrounding outer ring of polypropylene material compatible for purposes of welding or heat sealing with material used for forming the vent cavity.

25. The disc of claim 24 wherein the thickness of said disc is about 0.080–0.225 inch.

26. The disc of claim 24 wherein the disc has a flexural modulus of between 50,000 and 90,000 lb/in$^2$.

\* \* \* \* \*